Patented Oct. 13, 1953

2,655,501

UNITED STATES PATENT OFFICE 2,655,501

METHOD OF MAKING 5-FORMAMIDO-6-AMINO URACILS

Oliver J. Weinkauff, St. Louis, Mo., assignor to Monsanto Chemical Company, St. Louis, Mo., a corporation of Delaware No Drawing. Application June 3, 1948, Serial No. 30,970

7 Claims. (Cl. 260—256.4)

This invention relates to the preparation of caffeine and theophylline intermediates and, more particularly, to an improved method of formylating a 5,6-diamino uracil or the acid salts thereof.

It has been the practice in the acylation of amines to employ a large excess of concentrated acylating agent in order to obtain satisfactory yields of the acylated amine. The conventional practice of using an excess of concentrated formic acid in formylating 5,6-diamino uracils doubtless stems from the experience acquired in conventional processes for acylating amines. In the conventional procedure, ratios of 15–30 equivalents of 50–90% formic acid to 1 equivalent of the 5,6-diamino uracil are employed. When the 5,6-diamino uracil is employed in the form of the sulfate, the same ratios of formic acid to diamine sulfate are employed together with sodium formate, the latter being employed to neutralize the sulfate radical. The use of a large excess of concentrated formic acid in this operation presents a costly recovery problem involving expensive equipment. It is necessary, however, to recover the formic acid inasmuch as the quantity involved is a material element in the economics of the process.

One of the objects of the present invention is to provide an improved method of formylating a 5,6-diamino uracil or an acid salt thereof. Other objects will become apparent from the following description and examples.

According to the present invention, generally stated, I have found that 5,6-diamino uracils having the formula:

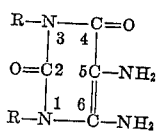

in which R represents hydrogen or an alkyl radical containing 1 to 3 carbon atoms, and the acid salts such as the sulfate, phosphate and chloride can be formylated to produce excellent yields of the corresponding 5-formamido-6-amino uracil having the formula:

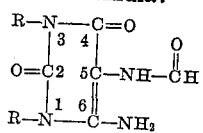

in which R again represents hydrogen or an alkyl radical containing 1 to 3 carbon atoms, by employing a dilute aqueous formic acid solution in the ratio of 1 to 5 equivalents of formic acid to one equivalent of the diamine. In a particular embodiment of the invention, one equivalent of 5,6-diamino uracil is heated with 1 to 5 equivalents of formic acid in dilute aqueous solution, and desirably 1 to 3 equivalents, at a temperature in the range of 80–103° C., or even higher if the reaction is conducted above atmospheric pressure. The resulting 5-formamido-6-amino uracil is thereafter recovered from the reaction mixture. When one equivalent of the acid salt of the 5,6-diamino uracil is employed, up to one equivalent of the formic acid may be replaced with sodium formate. For example, one equivalent of a 5,6-diamino uracil sulfate such as 5,6-diamino uracil sulfate or 1,3-dimethyl-5,6-diamino uracil sulfate may be heated in the presence of an aqueous solution of one equivalent of sodium formate and 1 to 4 equivalents of formic acid. The temperature of the reaction mixture is maintained within the range of 80–103° C., operating under reflux when the temperature is above 100° C. The reactants may be mixed at a temperature below the reaction range and the temperature may thereafter be raised to a point within the reaction range. By an alternative procedure, the sodium formate-formic acid solution is prepared and heated to a temperature within the reaction range. The diamino compound is thereupon added to the solution and the mixture is heated until the reaction is complete. The reaction time may vary somewhat with the temperature at which the reaction is carried out. For example, with 5,6-diamino uracil sulfate the reaction is substantially complete in approximately 1½ to 3 hours when the reaction temperature is in the range of 90–103° C. or higher. At lower temperatures, for example at 80° C., the reaction time is somewhat longer. It is desirable to agitate the reaction mixture during the course of the reaction.

The sodium formate-formic acid solution is desirably prepared by adding sufficient concentrated sulfuric acid to an aqueous sodium formate solution to produce in the solution a concentration of formic acid in the range of 1–5%. This solution may then be used in sufficient quantity to provide the proper equivalent ratio in the range of 5:1 of formic acid to diamine or diamine acid salt in the process of the present invention. This procedure of preparing the sodium formate-formic acid solution avoids the hazards involved in handling concentrated formic acid.

In the formylation of the sulfate of a 5,6-diamino uracil with dilute aqueous sodium formate-formic acid solutions, I have found that the sodium formate component of the reaction mixture may be reduced substantially from 1 mol to a half mol or even less and may be eliminated entirely. On the other hand, an excess of sodium formate, for example an excess of 5% or even higher, may be employed. As a further embodiment of the process of the present invention, the 5,6-diamino uracil sulfate may be heated at 80–103° C. with sodium formate in the ratio of one equivalent of the diamine to one equivalent of sodium formate, thereby avoiding the addition of any formic acid per se to the reaction mixture. In employing formic acid solution, it is desirable to use it in a ratio of 1 to 3 equivalents of formic acid to one equivalent of diamine, and not to exceed 5 equivalents of formic acid, since the 5-formamido-6-amino uracil product has an appreciable solubility in the resulting concentration of formic acid and thereby renders the recovery of the product more difficult. Likewise, in formylating an acid salt of the 5,6-diamino uracil, the ratio of formic acid or combined sodium formate-formic acid is desirably used in the ratio of 3 equivalents to one equivalent of the diamine acid salt, and not exceeding 5 equivalents, for the same reason.

After the reaction has been completed, the reaction mixture may be treated by any suitable means for the recovery of the 5-formamido-6-amino uracil. For example, in the formylation of the sulfate of 5,6-diamino uracil the reaction mixture may be cooled to 40° C. and the solid product may then be recovered from the reaction mixture by filtering the resulting slurry and washing the filter cake with water to remove the residual mother liquor. The washings and the mother liquor containing essentially sodium sulfate and some formic acid if over one equivalent of formic acid is used are discarded. The product may be dried if desired or used in the wet state for the production of caffeine or theophylline. The yields of 5-formamido-6-amino uracil by the process of the present invention are substantially quantitative, for example 93–95% theory.

The following examples will serve to illustrate the improved process of the present invention.

Example I

A solution of 16.4 pounds of sodium formate and 12.4 pounds of 95% sulfuric acid in 63.2 gallons of water was prepared. To this solution was added 49.5 pounds of sodium formate. The resulting solution (containing 0.24 equivalent of formic acid and 0.73 equivalent of sodium formate) was heated to a temperature in the range of 90–102° C., desirably operating under reflux when the temperature is 100° C. or above, and 244 pounds of moist (131.4 pounds dry) (0.67 equivalent) 5,6-diamino uracil sulfate was added in a period of 15–30 minutes. The equivalent ratio of formic acid to diamine sulfate in the reaction mixture was 1.44 to 1. The slurry thus formed was maintained at a temperature in the range of 90–100° C. and agitated for approximately 3 hours after the addition of the sulfate. Thereafter, the slurry was cooled to approximately 40° C. and the product, 5-formamido-6-amino uracil, was separated from the mother liquor, for example, by centrifuging the slurry and washed with water to remove residual mother liquor. The yield of 5-formamido-6-amino uracil was 93%. The mother liquor and washings were discarded.

Example II

The procedure of Example I was repeated using 151 pounds (dry weight) of 1,3-dimethyl-5,6-diamino uracil sulfate in place of the 5,6-diamino uracil sulfate. The product recovered from the reaction mixture was 1,3-dimethyl-5-formamido-6-amino uracil in good yields. The mother liquor and washings were discarded.

In place of 1,3-dimethyl-5,6-diamino uracil sulfate in the procedure of the present example, other 1,3-alkyl substituted 5,6-diamino uracil acid salts may be employed, for example, 1,3-diethyl-1,3-di-n-propyl- and 1,3-di-isopropyl-5,6-diamino uracil sulfates, phosphates or chlorides.

Example III

To a 2% solution of 3 equivalents of formic acid in water was added one equivalent of 5,6-diamino uracil. The mixture was heated to a temperature in the range of 80–90° C. and maintained in that range for approximately 5 hours. The reaction mixture was then cooled to 40° C. The material was filtered off and washed with water. The product may be used in the wet state for the production of caffeine or may be dried if desired. The yield was substantially quantitative. The mother liquor and washings were discarded.

Example IV

To a 2% solution of one equivalent of sodium formate in water was added one equivalent of 1,3-di-n-propyl-5,6-diamino uracil phosphate. The mixture was heated at 90–102° C. under reflux for approximately 3 hours. The reaction mixture was then cooled to 40° C. whereupon the product, 1,3-di-n-propyl-5-formamido uracil was precipitated. The material was filtered off, washed with water and dried. The yields were good. The mother liquor and washings were discarded.

I claim:

1. The improved process comprising heating 5,6-diamino uracil with a dilute aqueous formic acid solution, in the proportion of one equivalent of diamine to 1 to 5 equivalents of formic acid at a temperature above 80° C. and subsequently recovering 5-formamido-6-amino uracil from the reaction mixture.

2. The improved process comprising heating 5,6-diamino uracil sulfate with a dilute aqueous formic acid solution containing sodium formate in the proportion of one equivalent of diamine sulfate, 1 to 4 equivalents of formic acid and one equivalent of sodium formate at a temperature in the range of 80 to 103° C. and subsequently recovering 5-formamido-6-amino uracil from the reaction mixture.

3. In the process of preparing 5-formamido-6-amino uracil by the formylation of 5,6-diamino uracil, the steps comprising heating 5,6-diamino uracil with a dilute aqueous formic acid solution in the proportion of one equivalent of diamine to 1 to 5 equivalents of formic acid at a temperature in the range of 80 to 103° C. and subsequently recovering 5-formamido-6-amino uracil from the reaction mixture.

4. In the process of preparing 5-formamido-6-amino uracil by the formylation of 5,6-diamino uracil sulfate, the steps comprising heating 5,6-diamino uracil sulfate with a dilute aqueous formic acid solution containing sodium formate in the proportion of one equivalent of diamine sulfate, 1 to 4 equivalents of formic acid and one equivalent of sodium formate at a temperature in the range of 80 to 103° C. and subsequently recovering 5-formamido-6-amino uracil from the reaction mixture.

5. The improved process comprising heating 5,6-diamino uracil with a dilute aqueous formic acid solution having a formic acid concentration in the range of 2 to 5% in the proportion of one equivalent of diamine to 1 to 5 equivalents of formic acid at a temperature in the range of 80 to 103° C. for a period of time in the range of 1 to 5 hours, and recovering said formamido compound from the reaction mixture.

6. The improved process comprising heating 5,6-diamino uracil sulfate with a dilute aqueous formic acid solution having a formic acid concentration in the range of 2 to 5% prepared by mixing sodium formate and sulfuric acid in water, said reactants being employed in the proportion of one equivalent of diamine sulfate, 1 to 4 equivalents of formic acid and one equivalent of sodium formate at a temperature in the range of 80 to 103° C., until the reaction is complete, and recovering said formamido compound from the reaction mixture.

7. The improved process comprising heating 5,6-diamino uracil sulfate with sodium formate in water in the proportion of one equivalent of diamine sulfate to one equivalent of sodium formate at a temperature in the range of 80 to 103° C., and subsequently recovering 5-formamido-6-amino uracil from the reaction mixture.

OLIVER J. WEINKAUFF.

References Cited in the file of this patent

UNITED STATES PATENTS

| Number | Name | Date |
|---|---|---|
| 2,564,351 | Ballentyne | Aug. 14, 1951 |

OTHER REFERENCES

Gabriel et al.: Ber. Deut. Chem. 34 1246 (1901).
Traube, Ber. Deut. Chem. 42 181, 1909.
Baddiley et al.: J. Chem. Soc. 1943 383–6.
Fiat Final Report, No. 885, issue date Aug. 23, 1946. Published by the Office of Military Government for Germany (U. S.) p. 8.